Feb. 2, 1960  R. C. SHELEY  2,923,264
CAN BODY MAKING AND SIDE SEAM SOLDERING MACHINE
WITH SEAM ALIGNING DEVICE AND BRAKE
Filed April 21, 1954  3 Sheets-Sheet 2
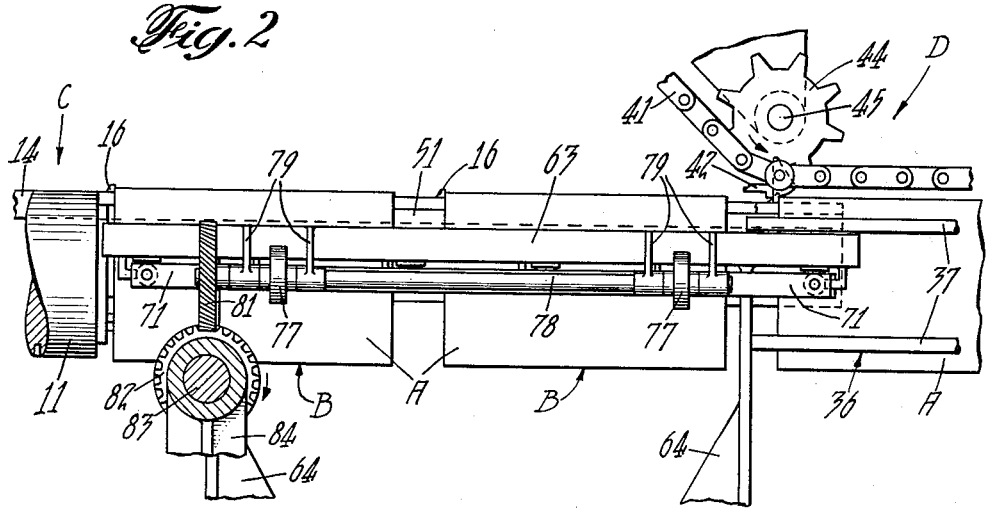
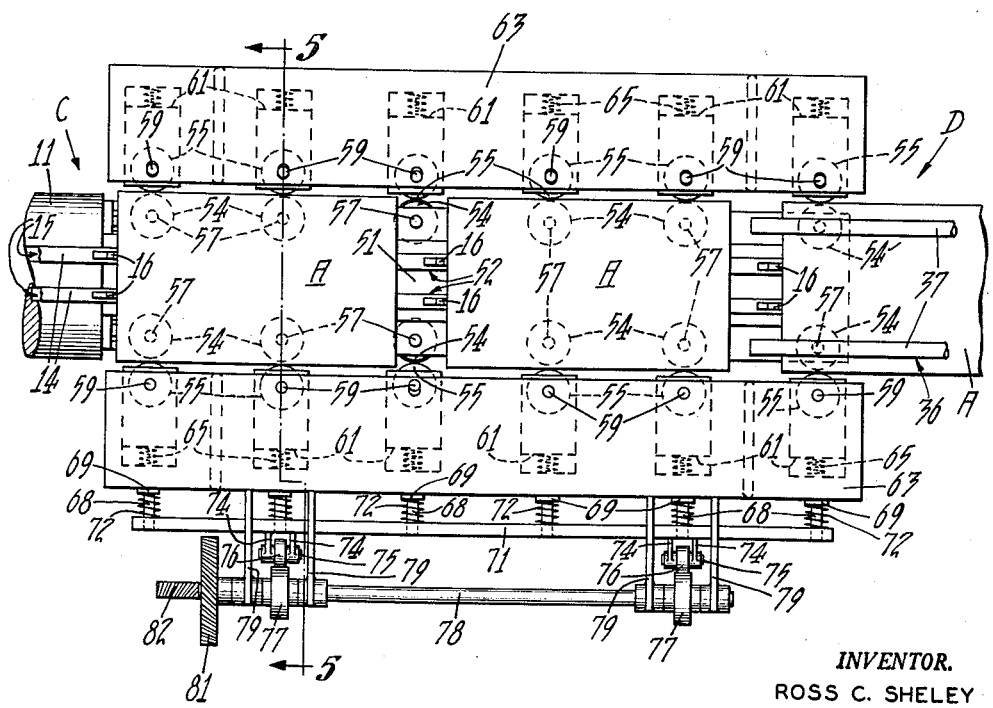
INVENTOR.
ROSS C. SHELEY

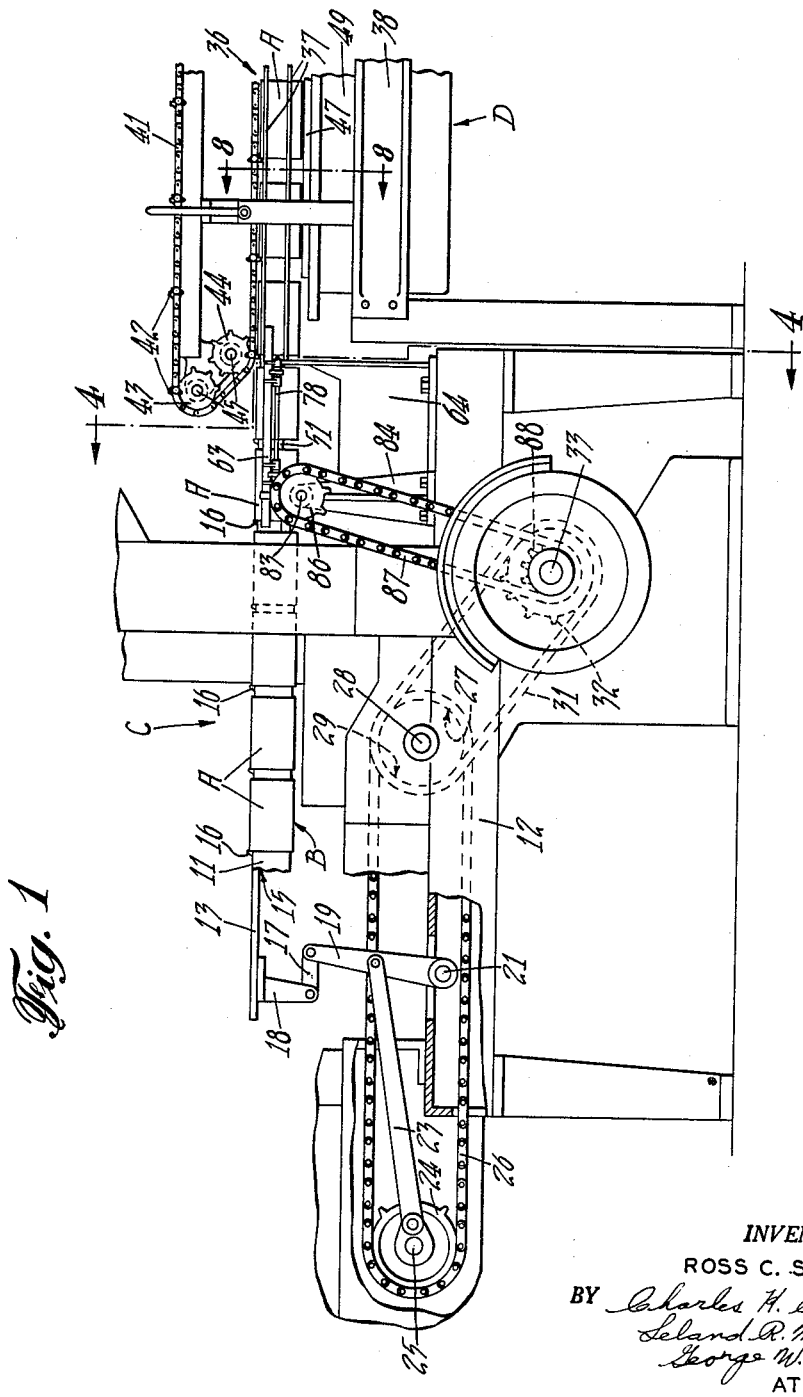

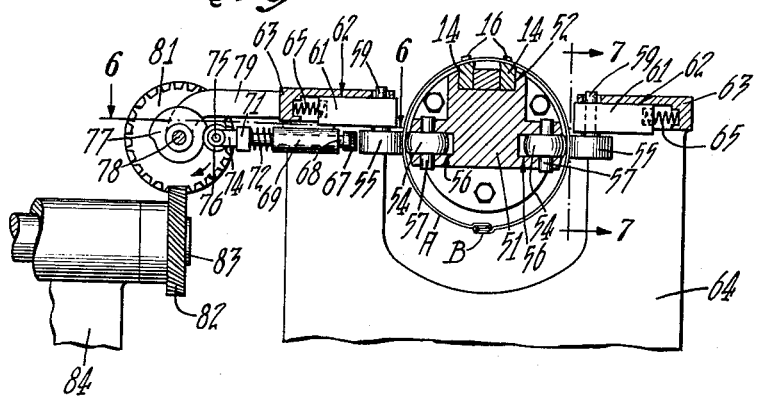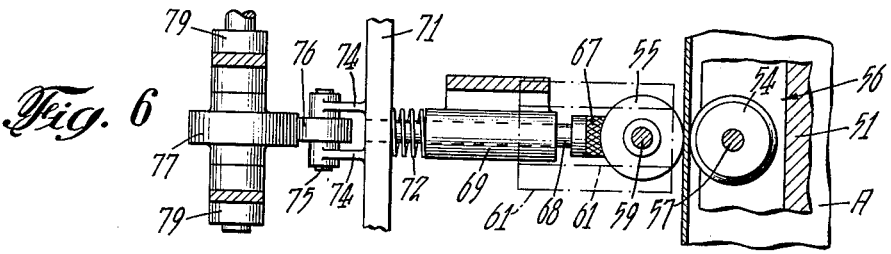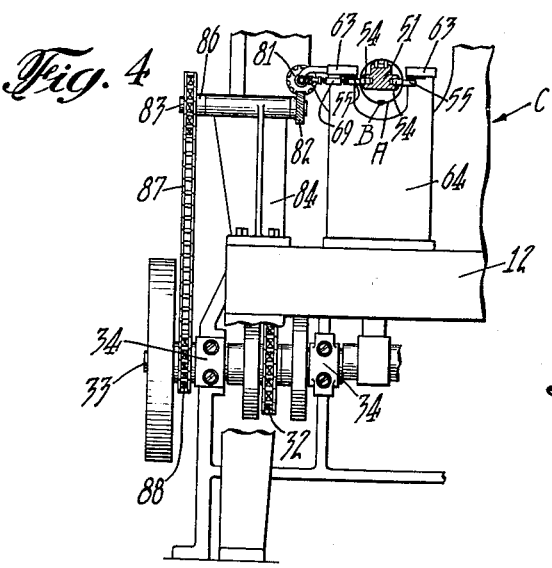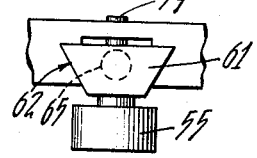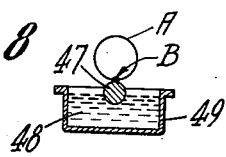

United States Patent Office 2,923,264
Patented Feb. 2, 1960

2,923,264

CAN BODY MAKING AND SIDE SEAM SOLDERING MACHINE WITH SEAM ALIGNING DEVICE AND BRAKE

Ross C. Sheley, Maywood, Ill., assignor to American Can Company, New York, N.Y., a corporation of New Jersey Application April 21, 1954, Serial No. 424,567

5 Claims. (Cl. 113—63)

The present invention relates to machines for making sheet metal can bodies having soldered side seams and has particular reference to devices for maintaining the side seams of the bodies in a predetermined aligned location for soldering.

In the manufacture of sheet metal can bodies, the bodies usually are made from a blank which is wrapped around a horn or mandrel in substantially tubular form and propelled along the horn through a plurality of working stations at which the side seam edges of the blank are notched, edged, interengaged and finally interfolded or locked together to produce the side seam which holds the body together. This formation of the side seam is effected in a can bodymaking unit or section of the machine. The forming horn of the bodymaker connects with a continuing horn of a side seam soldering unit or section of the machine which applies molten solder to the seam.

One of the most troublesome problems in the manufacture of such can bodies is the maintenance of the seam in properly aligned location while the body is conveyed along the horn from the bodymaker to the soldering station in the soldering unit. During this longitudinal advancement the body usually rotates or shifts slightly on the horn and thereby laterally displaces the side seam out of alignment with the soldering tools. Many devices have been developed and tried to overcome this trouble with some success but most existing devices are still unsatisfactory in one way or another.

An object of the instant invention is the provision in a can body making machine of improved devices which hold the side seam against lateral displacement thereby overcoming the above mentioned difficulties. By this invention the advancing bodies are supported on and travel between inner and outer cooperating pairs of rollers which press against the side walls of the bodies and hold them against rotation while simultaneously facilitating longitudinal advancement and thus retaining the side seams in the same relative location during advancement so that they will be in proper location for soldering.

Another object is the provision of such devices which permits of the advancement of the bodies without sliding over extended stationary surfaces and thereby prevents scratching any interior or exterior coating materials which may be carried by the bodies.

Another object is the provision of such devices wherein a braking action may be readily applied to the advancing bodies to stop them at a predetermined location without in any manner marring or otherwise injuring the inner or outer surfaces of the bodies.

Numerous other objects and advantages of the invention will be apparent as it is better understood from the following description, which, taken in connection with the accompanying drawings, discloses a preferred embodiment thereof.

Referring to the drawings:

Figure 1 is a side elevation showing principal parts of a can body making machine embodying the instant invention, with parts broken away and a procession of can bodies passing through the machine;

Fig. 2 is an enlarged elevation showing the portion of the machine which connects the body making and the soldering units, parts being broken away and parts being shown in section;

Fig. 3 is a top plan view of the parts shown in Fig. 2, with parts broken away;

Fig. 4 is an end view of the can body making unit of the machine as viewed along the broken line 4—4 in Fig. 1, with parts broken away and parts shown in section;

Fig. 5 is a transverse sectional view taken substantially along the broken line 5—5 in Fig. 3, with parts broken away;

Fig. 6 is a horizontal section taken substantially along the line 6—6 in Fig. 5, with parts broken away;

Fig. 7 is an elevational detail as viewed along a plane indicated by the line 7—7 in Fig. 5, with parts broken away; and Fig. 8 is a sectional view taken substantially along the line 8—8 in Fig. 1, with parts omitted.

As a preferred or exemplary embodiment of the invention the drawings illustrate principal parts of a can body making and side seam soldering machine of the character disclosed in United States Patent 1,770,041 issued July 8, 1930 to John F. Peters on Roll Bodymaker, and United States Patent 1,338,716 issued May 4, 1920 to M. E. Widell on Soldering Machine.

In such a can body making and soldering machine, tubular sheet metal can bodies A (Fig. 1) made from tin plate or the like material, are formed with side seams B (Fig. 5) and prepared for soldering during advancement in spaced and timed processional order along an inside mandrel or horn 11 supported in a frame 12 which constitutes the main frame of a can body making unit C. Advancement of the bodies along the horn 11 is effected in an intermittent or step-by-step manner, preferably by a reciprocating feed device which at the entrance end of the horn 11 comprises a single feed bar 13 (Fig. 1) and which at the discharge end of the horn branches out into a pair of spaced and parallel feed bars 14 (Fig. 2, 3 and 5), the feed bars 13, 14 being disposed in and operating in longitudinal grooves 15 formed in the horn. These feed bars 13, 14 are provided with spaced spring pressed retractable feed dogs 16 for propelling engagement behind the can bodies.

Reciprocation of the feed bars 13, 14 is effected by a link 17 (Fig. 1) having one end pivotally connected to a lug 18 which depends from the feed bar 13 and having its opposite end pivotally connected to a rocker arm 19 mounted on a pivot pin 21 carried in the frame 12. The arm 19 is rocked on its pivot pin 21 by a connecting rod 23 one end of which is pivotally connected to the arm. The opposite end of the connecting rod 23 is pivotally and eccentrically connected to a sprocket 24 mounted on a cross-shaft 25 journaled in suitable bearings in the frame 12.

Rotation of the sprocket 24 is effected by an endless chain 26 which operates over the sprocket and over an idler sprocket 27 mounted on a shaft 28 journaled in suitable bearings in the frame 12. The idler sprocket 27 is rotated by a second sprocket 29 mounted on the shaft 28 adjacent the sprocket 27 and rotated by an endless chain 31 which is driven by a driving sprocket 32 (see also Fig. 4) mounted on a main drive shaft 33 journaled in bearings 34 in the frame 12. The driving shaft 33 may be rotated in any suitable manner.

A side seam soldering unit D of the machine is disposed in longitudinal alignment with the body making unit C and includes an outside horse or mandrel 36 (Figs. 1, 2 and 3) which receives and guides the can bodies A through the soldering unit. This horse 36 comprises a plurality of spaced guide bars 37 which surround the can bodies and which are supported on a frame 38 which constitutes the main frame of the soldering unit.

The can bodies A are propelled through the horse 36 by a continuously moving endless chain conveyor 41 (Fig. 1) having gripper fingers 42 spaced at intervals along the chain. The fingers travel along the top of the horse. At the entrance end of the soldering unit, the conveyor 41 operates over a pair of vertically spaced sprockets 43, 44 mounted on shafts 45 journaled in suitable bearings in the frame 38. The conveyor 41 is continuously operated in any suitable manner, preferably by a synchronous connection with the body making unit as disclosed in the above mentioned Widell patent, so that the conveyor operates in timed relation with the feed bars 13, 14 of the body making unit.

In the soldering unit the conveyor 41 propels the can bodies A in spaced relation over and with their side seams B in contact with a conventional solder roll 47 (Figs. 1 and 8) which rotates continuously in a bath of molten solder 48 contained in a reservoir 49 carried by the frame 38. The solder roll carries a film of solder up from the bath and wipes it onto the side seams B of the advancing bodies to solder the seams in the conventional manner as disclosed in the Widell patent. It is for this reason that the side seams of the bodies as produced in the body making unit are required to remain in proper relative positions as they pass from the body making unit to the soldering unit so that the seams will properly contact the solder roll 47 and receive the solder properly.

In order to provide for the passage of the can bodies A from the body making unit C to the soldering unit D, the space between the discharge end of the inside horn 11 and the entrance end of the outside horse 36 is spanned by a bridge member, transfer support or mandrel section 51. One end of this transfer mandrel section 51 is connected to the discharge end of the horn 11 of the bodymaking unit C. The other end of the mandrel section 51 fits freely within and overlaps the outside horse 36 of the soldering unit D. This mandrel section 51 preferably is of inverted T-shape in cross-section as best shown in Fig. 5 and constitutes a reduced diameter continuation of the inside horn 11. In its upper portion the mandrel section 51 is provided with longitudinal grooves 52 for the can body feed bars 14 to permit the bars to travel up to the horse 36 and thus propel the can bodies A along the transfer mandrel section 51.

To keep the can bodies A from turning and thus maintain their side seams B in the required relative position for movement in a straight line path of travel as explained above, as the bodies are propelled along the transfer mandrel section 51, the bodies advance between cooperating pairs of freely rotatable inside-outside pressure rollers 54, 55 (Figs. 3, 5 and 6) which are disposed on opposite sides of the side wall of the can bodies and which squeeze this wall between them. The inside rollers 54 preferably have curved outer faces to substantially conform to the curvature of the inner surface of the can body side wall. The outside rollers 55 preferably have straight faces.

There are a plurality of these pairs of cooperating pressure rollers 54, 55, disposed in a horizontal position along the transfer mandrel section 51 on both sides thereof as shown in Figs. 3 and 5. The inside rollers 54 are located in a pair of opposed longitudinal clearance grooves 56 formed in the sides of the transfer mandrel section 51, the rollers being mounted on vertical pins 57 extending through the clearance grooves 56 and secured in the mandrel section.

The outside pressure rollers 55 are yieldably mounted on vertical pins 59 secured in horizontal slides 61 (see also Fig. 7) which operate in slideways 62 formed in a pair of stationary support rails 63 disposed on opposite sides of the transfer mandrel section 51 and secured to a bracket 64 (see Fig. 4) which extends up from the frame 12 of the can body making unit C. The outer ends of the slides 61 are backed up by compression springs 65 which force the slides inwardly toward the transfer mandrel section 51 and thus keep the outside pressure rollers 55 pressed towards the inside rollers 54.

Hence when a can body A is advanced along the transfer mandrel section 51, longitudinal portions of its side wall on both sides of the mandrel section pass between the cooperating pairs of inside-outside pressure rollers 54, 55 which apply a lateral pressure to the wall of the can body and thus keep the body advancing in a straight line while overcoming any tendency of the body to twist or turn during this advancement. This maintains the side seams B of the bodies in properly aligned position so that they will align with and properly receive solder from the solder roll 47 as hereinbefore mentioned.

Since the can bodies A advancing through the can body making unit C and along the transfer mandrel section 51 are moved intermittently by the feed bars 13, 14 up to and into the outside horse 36 of the soldering unit D for engagement by the feed or clamping fingers 42 of the continuously moving soldering conveyor 41, it is important to position the body A as it enters the soldering unit so that it will be properly gripped by the feed fingers 42. The body in advancing toward this position travels so freely between the pressure rollers 54, 55 that sometimes it travels too far for proper gripping by the feed fingers 42. To overcome this difficulty a brake is applied to the bodies traveling along the transfer mandrel section 51, at the end of the forward stroke of the feed bars 13, 14 and this instantly and accurately arrests the forward movement of the bodies and thus keeps them properly spaced apart and stops the body entering the soldering unit D at the proper place to be picked up by the soldering conveyor feed fingers 42.

This arresting of the advancement of the bodies A along the transfer mandrel section 51 preferably is effected by a plurality of brake shoes 67 which are disposed on one side of the transfer mandrel section 51 and which are individually in horizontal alignment with and immediately adjacent the outside pressure rollers 55 located on one side of the mandrel section 51. There is one brake shoe 67 for each pressure roller 55. The brake shoes 67 are mounted on the inner ends of horizontally disposed brake rods 68 (Figs. 3, 5 and 6) slidably carried in relatively long bearings 69 which depend from one of the support rails 63. The outer ends of all the rods 68 are secured in a plate 71 (see Fig. 3) which extends parallel with and for substantially the full length of the support rail 63. Compression springs 72 interposed between the ends of the bearings 69 and the plate 71, surround the brake rods 68 and force the plate 71 outwardly to keep the brake shoes 67 normally out of engagement with the pressure rollers 55.

The brake shoes 67 are moved in against the pressure rollers 55 in time with the reciprocation of the feed bars 13, 14 and only at the end of each forward or body advancing stroke. For this purpose the plate 71 near each end is formed with a pair of spaced lugs 74 (Figs. 3, 5 and 6) which carry a pin 75 having a cam roller 76 mounted thereon. The two cam rollers 76, one near each end of the plate 71, are held by the brake rod compression springs 72, against a pair of edge cams 77 which are rotated in time with the reciprocation of the feed bars 13, 14.

The two edge cams 77 are mounted on a horizontally disposed shaft 78 which is journaled in pairs of spaced bearing brackets 79 which extend outwardly from the support rail 63. The shaft 78 is rotated continuously by a helical gear 81 which is mounted on one end of the shaft 78 and which meshes with and is driven by a helical gear 82 mounted on an intermediate shaft 83 journaled in a bearing bracket 84 (see Figs. 1, 2 and 4) fastened to the frame 12 of the can body making unit C. The outer end of the intermediate shaft 83 carries a sprocket 86 which is driven by an endless chain 87 which operates on a sprocket 88 on the main drive shaft 33.

Hence as the feed bars 13, 14 approach the end of a can body advancing stroke, a high spot on the two cams 77 operate through the cam rollers 76 to push the plate 71 inwardly and thus push all of the brake shoes 67 into braking engagement against the outside pressure rollers 55 as best shown in Fig. 6. This action stops the free rotation of the rollers as effected by their engagement with the side wall of an advancing can body, and thus arrests further advancement of the body when the feed bars 13, 14 reach the end of their stroke.

The high spot on the edge cams 77 may be of any desired length to hold the can bodies in position for any desired period of time after their advancement has been arrested. In the instant case the cams 77 keep the brake applied and thus hold the can bodies stationary until the feed bars 13, 14 complete their return stroke so that the bodies are prevented from moving back with the feed bars. In some cases the cams 77 may be omitted and a constant braking action applied to the outside pressure rollers 55 to control the advancement of the can bodies. In such cases a continuous sliding action would take place between the brake shoes 67 and the outside pressure rollers 55 but there would be no sliding between the can bodies and the pressure rollers.

In this manner, the brake device stops and holds the advanced can bodies or any one of the bodies in the procession if desired, at a predetermined location or station so that a body may be prevented from over-traveling its stepped advancement and may also be held at a predetermined location for proper engagement by working tools at the station, such as in the instant case of locating the body properly for engagement by the feed or gripping fingers 42 on the soldering unit conveyor 41.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body making and soldering machine, the combination of feeding devices for longitudinally and intermittently advancing partially completed tubular can bodies having side seams from a seam forming station to a seam soldering station, inner and outer pressure rollers disposed in the path of travel of the side wall of the advancing can bodies for passage of said side wall therebetween, said rollers being mounted for free rotation in the direction of said advancement of the bodies and for restraining movement of the rollers laterally relative to said direction, whereby said rollers are operable against the inner and outer surfaces of the side wall of each can body to exert opposed inner and outer pressures against the side wall of each body to restrain said advancing bodies against rotation to maintain the side seams of said bodies in proper alignment for soldering, and braking means operable against said outer pressure rollers at the end of each of said intermittent advancements of said bodies for arresting free rotation of said rollers to arrest advancement of a said can body.

2. In a can body making and soldering machine, the combination of feeding devices for longitudinally and intermittently advancing partially completed tubular can bodies having side seams from a seam forming station to a seam soldering station, inner and outer pressure rollers disposed in the path of travel of the side wall of the advancing can bodies for passage of said side wall therebetween, said rollers being mounted for free rotation in the direction of said advancement of the bodies and for restraining movement of the rollers laterally relative to said direction, whereby said rollers are operable against the inner and outer surfaces of the side wall of each can body to exert opposed inner and outer pressures against the side wall of each body to restrain said advancing bodies against rotation to maintain the side seams of said bodies in proper alignment for soldering, a brake shoe disposed adjacent a said outer pressure roller, and means operable in time with said feeding devices for pressing said brake shoe against said roller at the end of each of said intermittent advancements of said bodies for arresting free rotation of said roller to arrest advancement of a said can body.

3. In a can body making and soldering machine, the combination of feeding devices for longitudinally and intermittently advancing partially completed tubular can bodies having side seams from a seam forming station to a seam soldering station, inner and outer pressure rollers disposed in the path of travel of the side wall of the advancing can bodies for passage of said side wall therebetween, said rollers being mounted for free rotation in the direction of said advancement of the bodies and for restraining movement of the rollers laterally relative to said direction, whereby said rollers are operable against the inner and outer surfaces of the side wall of each can body to exert opposed inner and outer pressures against the side wall of each body to restrain said advancing bodies against rotation to maintain the side seams of said bodies in proper alignment for soldering, a movable support member disposed adjacent said outer pressure rollers, a plurality of brake shoes mounted on said support member and disposed one opposite each of said outer pressure rollers, and actuating means operable in time with said feeding devices for shifting said support member to press said brake shoes against said rollers at the end of each of said intermittent advancements of said bodies for arresting free rotation of said rollers to arrest advancement of said can bodies.

4. In a can body making and soldering machine, the combination of feeding devices for intermittently advancing tubular can bodies having side seams along a predetermined path, pairs of pressure rollers disposed adjacent said path, each roller of a said pair being yieldably mounted and biased toward a surface of a can body wall in opposition to the other roller to maintain a constant but yielding pressure against the body wall passing therebetween to restrain the body against rotation and thus maintain its side seam in proper alignment for soldering, and braking means operable against at least some of said rollers at the end of each of said intermittent advancements of the bodies for arresting free rotation of said rollers to stop advancement of the bodies engaged thereby in the intervals between said intermittent advancements.

5. In a can body making and soldering machine, the combination of a can body making unit having a horn for supporting a partially completed tubular can body having a side seam disposed in a predetermined position, a soldering unit longitudinally spaced from and aligned with said body making unit and having a horse for supporting and guiding said can body, a bridge member disposed between and in longitudinal alignment with said horn and said horse, feeding devices adjacent said bridge member for intermittently advancing can bodies along said bridge member to transfer them from said horn to said horse, inner and outer pressure rollers disposed in the path of the side wall of each advancing can body for engagement with inner and outer surfaces of the side wall as it passes between the rollers, said rollers being mounted for free rotation in the direction of said advancement of the bodies and being restrained laterally relative to said direction, whereby said rollers restrain the bodies against rotation and thus maintain their side seams in proper alignment for soldering, and braking means operable against at least some of said pressure rollers at the end of each of said intermittent advancements of said body for arresting advancement of the can bodies engaged by the braked rollers.

References Cited in the file of this patent

UNITED STATES PATENTS

| | | |
|---|---|---|
| 444,000 | Leavitt | Jan. 6, 1891 |
| 842,926 | Walsh | Feb. 5, 1907 |
| 956,180 | Rudolphi | Apr. 26, 1910 |
| 1,050,956 | Kruse | Jan. 21, 1913 |
| 1,130,636 | Rudolphi | Mar. 2, 1915 |
| 1,237,805 | Norton | Aug. 21, 1917 |
| 1,589,059 | Fink | June 15, 1926 |
| 1,808,261 | Sessions | June 2, 1931 |
| 1,883,539 | Cameron | Oct. 18, 1932 |